Oct. 1, 1946.   A. R. LEE   2,408,661
AIR SPEED INDICATOR
Filed Nov. 20, 1943
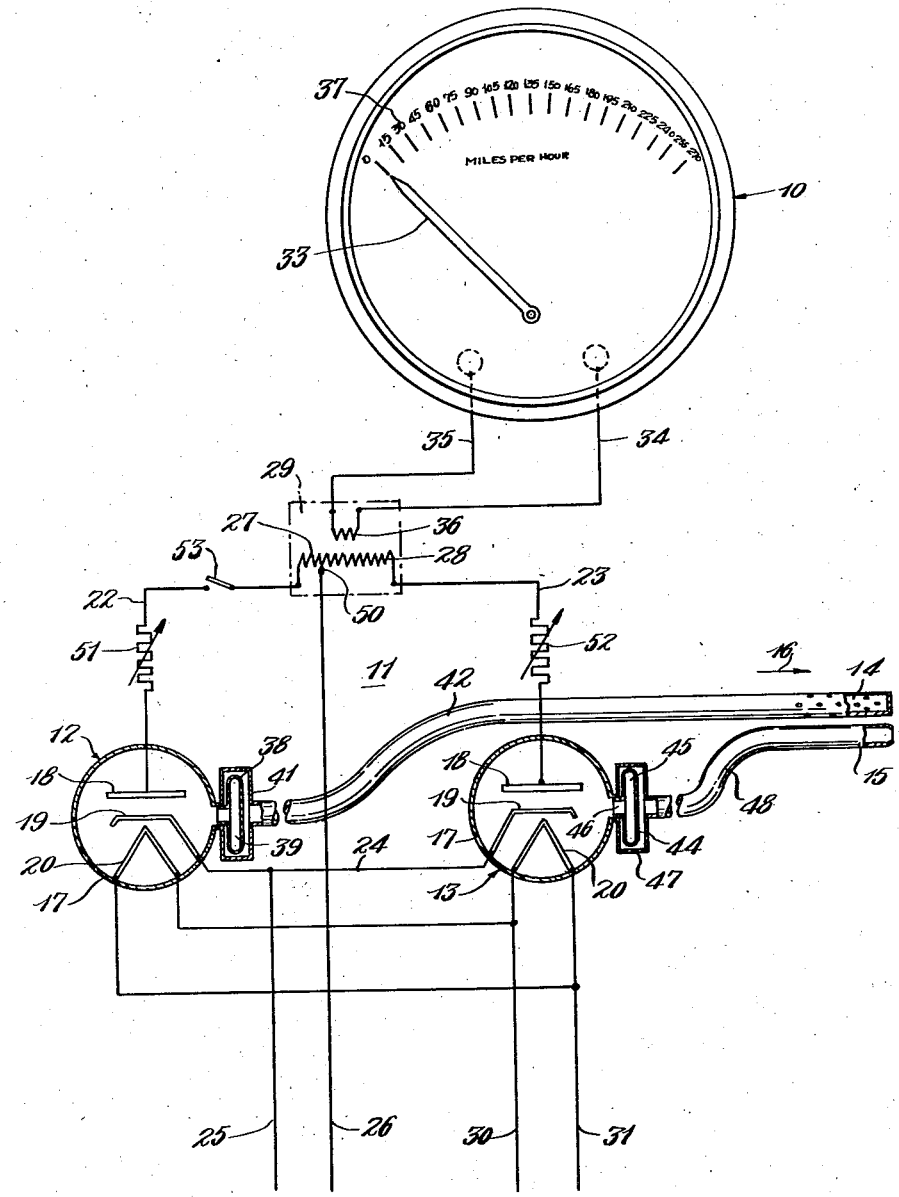
INVENTOR.
ASA REN LEE
BY
Kuris Hudson, Boughton & Williams
ATTORNEYS Patented Oct. 1, 1946

2,408,661

UNITED STATES PATENT OFFICE 2,408,661

AIR-SPEED INDICATOR

Asa Ren Lee, Cleveland, Ohio, assignor to Designers for Industry, Inc., Cleveland, Ohio, a corporation of Ohio Application November 20, 1943, Serial No. 511,167

5 Claims. (Cl. 73—212)

This invention relates to indicating instruments and aims to provide a novel form of instrument by which indications will be given in response to changes occurring in the velocity of a fluid.

Another object of my invention is to provide a novel form of indicating instrument for visibly indicating the true and indicated air speeds of an aircraft.

A further object of my invention is to provide a novel indicating instrument containing a meter, and an operating or control means therefor embodying electron tubes which are responsive to changes in the pressure and velocity factors of a fluid.

The invention may be further briefly summarized as consisting in certain novel combinations and arrangements hereinafter described and particularly set out in the appended claims.

In the accompanying sheet of drawings, the single view is a diagram representing an indicating instrument embodying my invention.

My novel indicating instrument is applicable to various uses where it is desired that indications be given of changes occurring in the pressure and velocity factors of a fluid. The embodiment of the invention illustrated in the drawing shows the instrument adapted for use as an air speed indicator for aircraft and for which use the instrument is especially suitable.

As shown in the drawing, my novel indicating instrument comprises a meter 10 and a control or energizing means 11 therefor embodying electron tubes 12 and 13 which are responsive respectively to changes in the pressure and velocity factors of a fluid. As will be explained in greater detail hereinafter the electron tubes 12 and 13 are connected respectively with the static tube 14 and the Pitot tube 15 of an aircraft so that the electron tubes will be responsive to atmospheric changes occurring in the static and Pitot tubes in response to operation of the aircraft at different speeds and altitudes. The static and Pitot tubes 14 and 15 are represented as being of a conventional form used on aircraft and the direction of flight is represented by the arrow 16.

The electron tubes 12 and 13 are substantially identical and each comprises an envelope or casing 17 containing a plate 18, a cathode 19 and a heater 20 for the cathode. In constructing these electron tubes, the envelope 17 is initially evacuated and a small amount of a suitable gas, such as neon gas, is introduced into the envelope and sealed therein so that when the cathode 19 is heated by the heater 20 a flow of electrons will take place from the cathode to the plate 18.

The plates 18 of the electron tubes 12 and 13 are connected in parallel plate or output circuits by the conductors 22 and 23 and by the conductor 24 which connects the cathodes 19 with each other. An appropriate voltage or potential is supplied to the plate circuits by the conductors 25 and 26 which are connected with voltage source suitable for this purpose. In the circuit arrangement here shown the conductor 26 is connected with the plate circuits through unequal sections 27 and 28 of an inductive coupling or transformer 29, so that the plate circuits include parallel portions extending to the electron tubes 12 and 13 as represented by the conductors 22 and 23. Electric current of appropriate characteristics is supplied to the heaters 20 of the electron tubes by conductors 30 and 31.

The meter 10 comprises any suitable form of electrically operated meter or indicator, for example, a galvanometer of conventional construction and having a movable pointer or needle 33. Conductors 34 and 35 connect the meter with a coil 36 of the inductive coupling 29 and provide an energizing circuit for the meter. The meter is also provided with a series of numerals or indications 37 forming a scale with which the movable pointer 33 cooperates. The distance which the pointer moves along the scale 37 is dependent upon the extent to which the meter circuit is energized.

As mentioned above in a general way, the electron tubes 12 and 13 have a quantity of gas sealed therein and are responsive respectively to atmospheric changes occurring in the static and Pitot tubes 14 and 15. To render the electron tube 12 responsive to such atmospheric changes in the static tube 14, I provide this electron tube with a flexible wall portion which, in this instance, is in the form of a hollow diaphragm device or bellows 38 having a chamber 39 therein. The flexible device 38 has a sealed connection with the envelope 17 of the electron tube so that the chamber 39 is in direct communication with the interior of the envelope. The diaphragm device 38 is located in an air-tight housing 41 which is connected with the static tube 14 by a conduit 42.

When pressure changes occur in the static tube 14 as the result of operation of the airplane at different altitudes, these changes are transmitted through the conduit 42 to the housing 41 and act on the outside of the flexible diaphragm of the device 38 so as to cause corresponding variations in the pressure of the gas contained in the envelope 17 of the electron tube 12. Thus when the aircraft is operating at a low altitude, an increased atmospheric pressure will act on the diaphragm device 38 tending to collapse the same and thereby forcing additional gas into the envelope 17 to increase the gas pressure in the latter. When the aircraft is operating at a relatively higher altitude, the pressure acting on the diaphragm device 38 is partially relieved, permitting gas to flow thereinto from the envelope 17 and thus decreasing the gas pressure in the latter. When the gas pressure in the electron tube 12 is increased or decreased in this manner the flow of electrons between the cathode and plate, and likewise the plate current or electrical output for this electron tube, will also be varied.

To render the electron tube 13 responsive to atmospheric changes occurring in the Pitot tube 15, I provide this electron tube with a similar hollow flexible diaphragm device or bellows 44 having a chamber 45 therein. This diaphragm device is connected with the sealed envelope 17 so that the chamber 45 will be in direct communication with the interior of the envelope through the passage 46. The diaphragm device 44 is located in an airtight housing 47 which is connected with the pitot 15 by a conduit 48.

When the velocity of the aircraft increases, the air pressure or velocity effect in the Pitot tube will be correspondingly increased and will be transmitted to the casing 47 through the conduit 48 and acting on the outside of the diaphragm device 44 will tend to collapse the same thereby displacing gas into the envelope 17 to correspondingly increase the pressure in the latter. A decrease in the speed of the aircraft will produce the reverse effect, that is to say, the pressure on the outside of the flexible device 44 will be reduced and the gas pressure in the envelope 17 will be correspondingly decreased. Changes in the gas pressure in the electron tube 13 produced in the manner just described will result in variations in the flow of electrons from the cathode 19 to the plate 18 with corresponding variation in the plate current or electrical output for the electron tube 13.

Since the electron tubes 12 and 13 are connected in parallel plate circuits or output circuits through the coil portions 27 and 28 of the inductive coupling 29, the energization of the plate circuit in the manner above described, either by the electron tube 13 alone or jointly by both electron tubes, will result in energization of the meter circuit and cause movement of the pointer 33 along the scale 37. The point 50 at which the conductor 26 is connected with the coupling 29 or, in other words, the lengths or inductive values of the coil sections 28 and 27 may be varied depending upon various factors such as the characteristics of the electron tubes 12 and 13 and of the static and Pitot tubes 14 and 15 as well as the operating characteristics of the aircraft at different altitudes and possibly various other factors The above described arrangement for the electron tube 12 enables the same to function as an altitude compensator by supplying varying amounts of plate current through the coil section 27 in response to changes in the operating altitude of the aircraft. The above described arrangement for the electron tube 13 enables the latter to measure the relative or indicated air speed of the aircraft and to produce corresponding current variations in the coil section 28 of the coupling 29. The combined effects of the current values in the coil sections 27 and 28 will result in energization of the meter 10 in a manner to produce accurate indications of the true air speed of the aircraft. The compensating effect of the electron tube 12 is thus automatically applied to the action of the electron tube 13 so that the measurements given by the latter will be accurate for all altitudes.

For calibrating purposes, the portion of the plate circuit of the electron tube 12 represented by the conductor 22 may contain a variable resistance or potentiometer 51. For a similar purpose a variable resistance or potentiometer 52 is provided in the portion of the plate circuit of the electron tube 13 which is represented by the conductor 23.

A switch 53 is preferably also provided in the plate circuit of the electron tube 12 so that by opening this switch the electron tube 12 can be isolated or rendered ineffective, whereupon the meter 10 will be controlled or actuated only by the electron tube 13 and relative or indicated air speeds can be read from the meter instead of true air speed values. By closing the switch 53 the effectiveness of the electron tube 12 is restored, so that true air speed values will again be indicated by the meter 10.

Although I have shown in the drawing only one meter 10, it should be understood that a number of such meters can be actuated or controlled by the electron tube apparatus 11. These additional meters can be located at desired points in the aircraft and the conductors 34 and 35 can be extended thereto to connect the same with the coil 36 of the inductive coupling 29.

From the foregoing description and the accompanying drawing it will now be readily understood that I have provided a novel form of indicating instrument which can be used to give indications in response to changes occurring in the velocity of a fluid, and which is especially suitable for use as an air speed indicator for aircraft.

While I have illustrated and described my novel indicating instrument in considerable detail it will be understood, of course, that I do not wish to be correspondingly limited but regard my invention as including all changes and modifications coming within the scope of the appended claims.

Having thus described my invention, I claim:

1. An indicator of the character described comprising a plurality of electron tubes having output circuits connected in parallel, each of said electron tubes having gas sealed therein and the electrical output of each electron tube being variable in accordance with changes in the gas pressure therein, a Pitot tube located to be acted upon by a fluid stream, fluid impulse conducting means connecting said Pitot tube with one of said electron tubes so that velocity changes in said stream will produce corresponding variations in the gas pressure in said one electron tube, a static tube, fluid impulse conducting means connecting said static tube with another of said electron tubes for varying the gas pressure therein in accordance with changes in the static pressure of said fluid, and a meter electrically connected with said output circuits.

2. An instrument for an aircraft having a static tube and a Pitot tube, comprising a pair of electron tubes having plate circuits connected in parallel, said electron tubes having gas therein and their electrical ouput being variable in accordance with variations in the pressure of the gas therein, fluid impulse transmitting means connecting said static tube with one of said electron tubes so that the gas pressure in the latter varies with the pressure variations in said static tube, fluid impulse transmitting means connecting said Pitot tube with the other electron tube so that the gas pressure in the latter is varied in response to variations in pressure in said Pitot tube, and a meter electrically connected with said parallel plate circuits.

3. An instrument for an aircraft having a static tube and a Pitot tube, comprising a pair of sealed electron tubes containing gas and having plate circuits connected in parallel, a diaphragm device connecting said static tube with one of said electron tubes so that the pressure of the gas in the latter varies with pressure variations in said static tube, a diaphragm device connecting said Pitot tube with the other electron tube so that the pressure of the gas in the latter varies with pressure variations in said Pitot tube, and a meter electrically connected with said plate circuits.

4. An instrument of the character described comprising, a pair of electron tubes having output circuits connected in parallel and each electron tube having a sealed envelope containing gas and its electrical output being variable in response to changes in the pressure of the gas therein, said envelope including a flexible portion, a static tube located to be acted upon by the pressure of a moving fluid, means connecting said static tube with one of said electron tubes so that changes in the pressure of said fluid will act through the flexible portion of said one electron tube to produce corresponding variations in the pressure of the gas therein, a Pitot tube located to be acted upon by the velocity of said fluid, means connecting said Pitot tube with the other of said electron tubes so that changes in the velocity of said fluid will act through the flexible portion of said other electron tube to cause corresponding variations in the pressure of the gas therein, and an indicator electrically connected with said output circuits so as to be responsive to the combined ouput effect of said electron tubes.

5. An instrument of the character described comprising, a pair of electron tubes having output circuits connected in parallel and each electron tube having a sealed envelope containing gas and its electrical output being variable in response to changes in the pressure of the gas therein, said envelope including a flexible hollow member, a housing for the flexible hollow member of each electron tube, a static tube located to be acted upon by the pressure of a moving fluid, fluid impulse conducting means connecting said static tube with the housing of one of said electron tubes so that changes in the pressure of said fluid will act through the flexible hollow member of said one electron tube to produce corresponding variations in the pressure of the gas therein, a Pitot tube located to be acted upon by the velocity of said fluid, fluid impulse conducting means connecting said Pitot tube with the housing of the other of said electron tubes so that changes in the velocity of said fluid will act through the flexible hollow member of said other electron tube to produce corresponding variations in the pressure of the gap therein, and an indicator electrically connected with said output circuits so as to be responsive to the combined output effect of said electron tubes.

ASA REN LEE.